Jan. 9, 1940.  H. KLEIN  2,186,645
PROCESS FOR REDUCING MATERIAL CONTAINING ZINC IN SHAFT FURNACES
Filed March 22, 1938
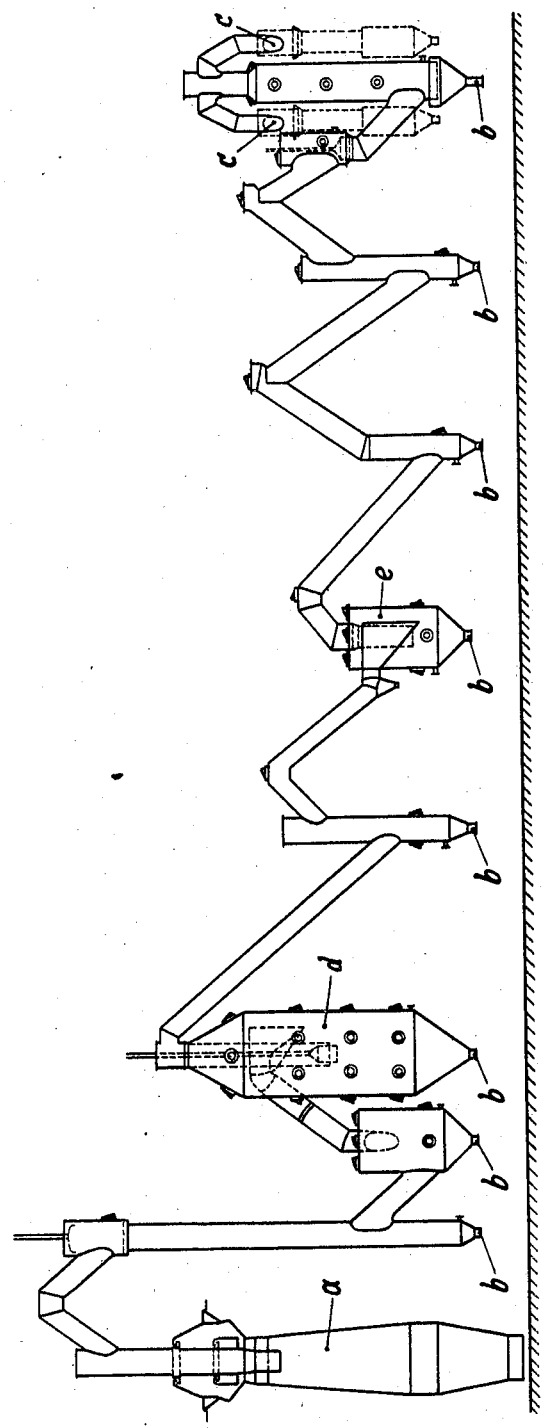
H. Klein
Inventor
By: Glascock Downing & Seebold
Attys.

UNITED STATES PATENT OFFICE 2,186,645

PROCESS FOR REDUCING MATERIAL CONTAINING ZINC IN SHAFT FURNACES

Hugo Klein, Niederschelden, Germany, assignor to Huttenwerke Siegerland Aktiengesellschaft, Siegen, Westphalia, Germany Application March 22, 1938, Serial No. 197,479
In Germany November 29, 1937

1 Claim. (Cl. 75—21)

Very many proposals have been made for the reduction of material containing zinc in shaft furnaces. A perusal of the patent literature relating to this subject might give the idea that the question of reducing material containing zinc in shaft furnaces has been completely and successfully solved. This is, however, not the case, which is best proved by the fact that up to the present the dumps of calcined pyrites containing zinc are still left untouched after years and that the large dumps of slag from lead production, which in Germany amount to millions of tons, have not only remained unworked but continually increase month by month.

According to the invention it has become possible to successfully reduce material containing zinc in a shaft furnace (iron blast furnace) in a surprising manner by jointly employing the following measures:

1. Filling the blast furnace as high as the charging apparatus of the furnace will allow;
2. The temperature of the air blast must amount to at least 850° C., preferably about 900° C. at the point of admission into the blast furnace;
3. The temperature of the gases passing off from the charge must be maintained higher than 300° C., preferably between 350 and 550° C.

By the employment of these measures in combination it is possible to treat a mixture of ores and fluxes which contains more than 3% of zinc, calculated on the mixture, and even 6% and more. It is preferable to make the mixture of such composition that it contains, besides iron carriers practically free from zinc which are to give a required content of manganese to the open hearth pig iron and which amount to about one third of the quantity of ore, a second third consisting of calcined pyrites and a third third of lead slag. For months past an ore mixture composed of about one-third Siegerland sparry iron ore and raw spar, one-third Stürzelberg calcined pyrites, and one-third lead slag has been reduced and can be treated without difficulty. The ore mixture has an average content of 6.5 to 7% zince and 0.6 to 0.8% lead.

Another remarkable fact is, that it is not necessary in this method to previously crush and sinter the lead slags, as they can be charged in lumps about the size of a fist. Another advantage is, that the lead contained in the ores, the calcined pyrites and the lead slags is obtained in liquid state and not in the form of lead oxides which would pollute the zinc-containing gases.

It is known that it is undesirable for the charge dust from the throat of the furnace containing zinc to show appreciable quantities of lead oxides, as the subsequent separation and recovering of zinc and lead is then rendered considerably more difficult.

The Siegerland sparry iron ore has about the following composition: iron 47.67%, manganese 10.78%, other components including silicon about 25%. The Siegerland raw spar had about 34.31% iron, 7.5% manganese, residues of carbonic acid, silicon, water and other components generally contained in ores.

The calcined pyrites show in sintered state in the analysis for example 48% iron, 8.5 to 9% zinc and 0.25% lead. The lead slags originating from the recovery of lead and used for the reduction contain about 25 to 31% iron and mostly 11 to 14% zinc and 1.5 to 2% lead.

The pig iron is obtained in the quality of a very good open hearth pig iron and of an addition iron with lower percentage of carbon, which is employed as special foundry addition iron. Both sorts have proved very satisfactory in the further treatment both in steel works and in numerous foundries.

However, owing to the low percentage of phosphorus in these waste materials, there is nothing to prevent the production of a hematite pig iron, without technical difficulties. This is the more important, where there is not available any hematite ore free from phosphorus.

The invention has aroused great interest in the competent circles both at home and abroad, as is proved by the trade paper "Iron Age" of June 24, 1937 in which the following appears on page 84: "German iron pyrites have always labored under a considerable handicap owing to their high zinc content, it is pointed out, and while other processes for zinc recovery have been developed, none until the one recently announced, have enabled blast furnaces to effectively utilize pyrite cinders."

Another point worthy of particular mention is that a specially adapted construction of the blast furnace and use of air enriched with oxygen are not necessary. However, it is specially advantageous to alter the gas conduit in that the entire conduit from the blast furnace to the gas purification consists only of vertical pipes or of pipes extending at an angle of at least 50° to the vertical and that there is no appreciable horizontal length of piping at any point of the gas conduit, so that no deposits of dust can occur. That quantity of dust which collects at the lower tap points must be drawn off daily and continually from the conduits. It is also advantageous to introduce between the blast furnace and fines purification series connected dry separators or "whirlers" (that is dust pockets with tangential gas inflow) of such size and in such number that, whilst cooling the gases, so much heavy dust containing iron is separated out in dry condition that only a very fine dust very poor in iron but enriched with zinc is separated and washed out. In the fines purification for example a fine dust with about 1% and less of iron and a zinc content of more than 60% is obtained.

The heavy dust containing iron which is removed from the dry separators or whirlers is returned into the blast furnace in moistened state so as to obtain the whole of the zinc in the dust of the fines purification which is very poor in iron but rich in zinc.

The drawing shows in diagrammatic view the arrangement of such a conduit.

$a$ is the blast furnace in longitudinal section,
$b$ are the tap points for the dust.
At $c$ the gas enters the gas purifying plant,
$d$ and $e$ are dry separators which are constructed as so-called "whirlers".

I claim:

Process for the reduction of zinc-containing material in an iron blast furnace, consisting in smelting a charge consisting of the usual fuel and fluxes and of a mixture of about ⅓ iron ores free from zinc, ⅓ roasted pyrites containing zinc and ⅓ lead slag containing zinc, the blast furnace being charged with said charge as high as the charging apparatus permits, the temperature of air at the point of entrance being maintained at least at 850° C., the temperature of the gases discharged at the throat opening being maintained at least at 300° C.

HUGO KLEIN.